April 21, 1970      E. R. SIGNER      3,507,169

POLYGON INDEXING DEVICE

Filed March 28, 1966      3 Sheets-Sheet 1

*INVENTOR.*
ERNST RICHARD SIGNER

BY

ATTORNEY

April 21, 1970     E. R. SIGNER     3,507,169

POLYGON INDEXING DEVICE

Filed March 28, 1966     3 Sheets-Sheet 2

INVENTOR.
ERNST RICHARD SIGNER

BY

ATTORNEY

April 21, 1970     E. R. SIGNER     3,507,169
POLYGON INDEXING DEVICE

Filed March 28, 1966     3 Sheets-Sheet 3

INVENTOR.
ERNST RICHARD SIGNER
BY

ATTORNEY

United States Patent Office 3,507,169
Patented Apr. 21, 1970

3,507,169
POLYGON INDEXING DEVICE
Ernst R. Signer, Eastchester, N.Y., assignor to Stoffel-Fortuna, Inc., Tuckahoe, N.Y.
Filed Mar. 28, 1966, Ser. No. 538,015
Int. Cl. B23q 17/00; B23b 29/24
U.S. Cl. 74—826                               17 Claims

ABSTRACT OF THE DISCLOSURE

An indexing device including a plurality of relatively rotatable members arranged coaxially about a main shaft, one end of which shaft is adapted to support a chuck. The plurality of relatively rotatable members are constructed in the form of polygonal cylinders and are arranged to engage simultaneously with the external annular surface of one member mating with an internal annular surface of another. At least one of the members may have an external configuration differing from its internal configuration, the remaining members each being designed to mate with either the internal or external configuration thereof. The invention further contemplates appropriate manual or automatic control means to axially displace the members with respect to one another, the mating surfaces of said members being similarly tapered in the axial direction thereof, and further control means for rotating one or more of the members with respect to the others.

---

The present invention relates to an indexing device, and more particularly to a polygon indexing device utilizing so-called polygon profiles as a means of providing circle divisions in indexing devices.

Various indexing devices are known in the prior art. One such prior art device utilizes dowel-pins and apertures with respective relatively movable parts to permit a step-by-step indexing movement of the parts. Aside from the lack of accuracy of such devices, the relatively small pins used for indexing purposes are unable to withstand the loads and stresses that occur with large off-center loads, for example, when using the indexing device on a chuck of a machine tool. Additionally, such prior art devices are inadequate in the requirement to hold the workpiece firmly as is necessary, for example, when making heavy cuts requiring a high degree of stability.

Other, more accurate indexing devices are known in which specially designed gears are used to provide the indexing function. Among the latter indexing devices those known as spur-teeth indexing mechanisms which are more satisfactory as to load carrying capacity than the pin-type indexing devices yet entail certain drawbacks and being extremely costly to manufacture and complicated from a mechanical point of view.

The present invention aims at obviating the aforementioned drawbacks and consists of an indexing device having several relatively movable parts provided with so-called polygon profiles which provide accurate circle divisions by extremely simple means.

The so-called polygon profiles may be manufactured on polygon grinders, for example, on grinders sold by Fortuna-Werke, Stuttgart-Bad Cannstatt, Germany, with an accuracy such that the profiles have almost perfect indexing from one profile lobe to the other. For example, on the so-called P3 profile, the lobes of trochoidal shape can be ground so as to be apart 120°±2 seconds.

Accordingly, it is an object of the present invention to provide an indexing device which obviates by extremely simple means the aforementioned drawbacks and disadvantages encountered with the prior art constructions.

It is another object of the present invention to provide an indexing device utilizing polygon profiles to provide accurate circle divisions which effectively harmonizes the requirement for high accuracy with the requirements of high load carrying capacity and simplicity in design.

A further object of the present invention resides in an indexing device of the type described above which may be readily manufactured, yet assures high accuracy in the desired indexing positions.

Still another object of the present invention resides in an indexing device utilizing polygon profiles which is simple in construction and design, is capable of withstanding high loads, and relatively inexpensive notwithstanding the high accuracy achieved thereby.

Another object of the present invention resides in an indexing device that can be readily actuated from one indexing position to another by extremely simple means without sacrifice in the accuracy of the respective indexing positions.

A further object of the present invention resides in an indexing device utilizing polygon profiles which greatly simplifies the selective indexing movements by the self-aligning feature of the polygon profiles, thereby obviating the need for exact positioning means when displacing the relatively movable parts from one to the next indexing position.

A further object of the present invention resides in an indexing device of the type described above that lends itself readily to hydraulic and/or pneumatic control by extremely simple control means utilizing simple parts that do not require high accuracies.

These and other objects, features and advantages of the present invention will become more obvious from the following description when taken in connection with the accompanying drawing which shows, for purposes of illustration only, two embodiments in accordance with the present invention, and wherein.

The indexing device in accordance with the present invention comprises several relatively rotatable parts, namely, a polygon master plate provided with dissimilar internal and/or external polygonal surfaces and one or more parts with complementary external and internal surfaces, respectively, whereby the indexing operation is realized by relative rotation of the parts after disengagement of the complementary polygonal surfaces by relative axial movement and subsequent reengagement of the complementary polygonal surfaces. If a more refined and versatile indexing is desired, the polygon master plate is provided with dissimilar polygonal surfaces along the inside and outside thereof, which are adapted to match with complementary polygonal surfaces provided along the external surfaces of an inner member and the internal surfaces of an outer member in coaxial arrangement with the master plate. Appropriate manual or automatic control means are provided to axially disengage the complementary surfaces of the associated parts, to rotate the same to the approximate next indexing position and to thereafter automatically bring about, with accuracy, the next indexing position by the re-engagement of the complementary surfaces.

Figure 1:
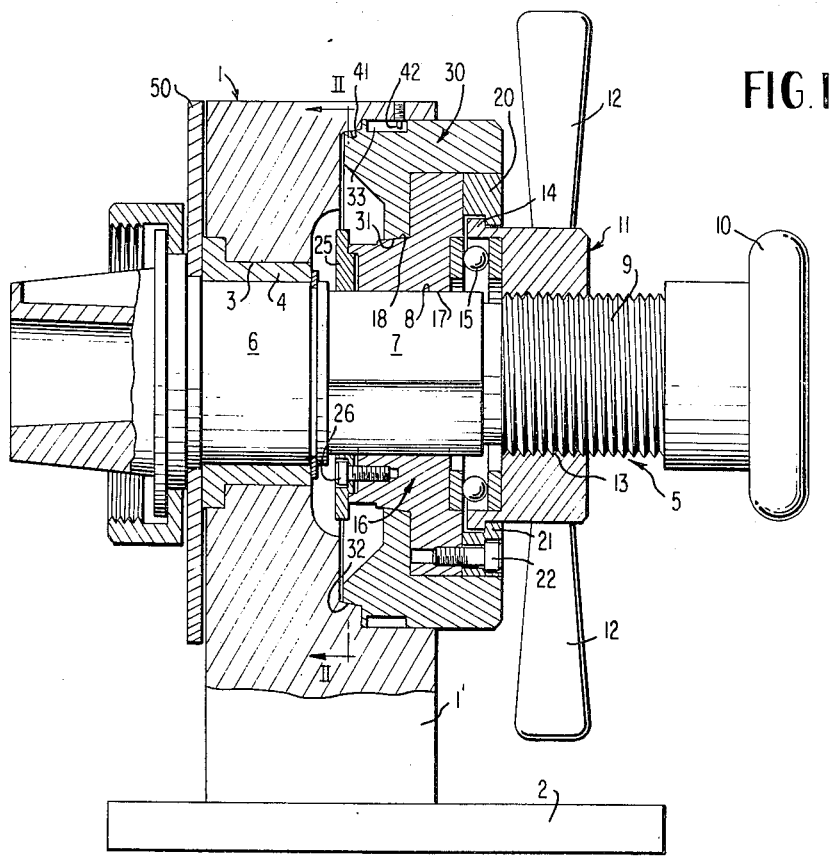
FIGURE 1 is an axial cross-sectional view through a hand-operated chuck utilizing a polygon indexing device in accordance with the present invention.
Figure 2:
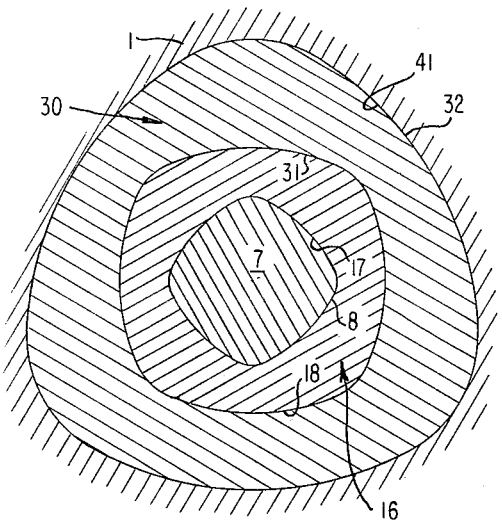
FIGURE 2 is a partial transverse cross-sectional view, taken along line II—II of FIGURE 1.

Referring now to the drawing wherein like reference numerals are used throughout the various views to designate like parts and more particularly to FIGURES 1 and 2, reference numeral 1 designates therein the housing which with its pedestal portion 1' rests on a mounting plate 2. The housing 1 is provided with an axial bore 3 accommodating therein by the intermediary of an appropriate bearing bushing 4 the cylindrical portion 6 of smooth, outer configuration of the main shaft generally designated by reference numeral 5. The cylindrical portion 6 of the main shaft 5 is adjoined to the right, as viewed in FIGURE 1, by a cylindrical portion 7 of smaller configuration than the cylindrical portion 6 and provided with polygon surfaces 8. The portion 7 of the main shaft 5 is adjoined, in turn, by the externally threaded portion 9 and terminates in a hand wheel 10. The other hand wheel generally designated by reference numeral 11 is provided with radial arms 12 and with an internal threaded bore 13 engaging with the external threads of the main shaft portion 9. The hand wheel 11 is provided with a shoulder-like flange 14; a conventional anti-friction bearing 15 rotatably supports the shoulder 14 and therewith the hand wheel 11.

The inner polygon plate member generally designated by reference numeral 16 is provided with polygon surfaces 17 engaging with polygon surfaces 8 of the main shaft portion 7 so that the inner polygon plate member 16 is rotatably connected with the main shaft 5 to rotate in unison therewith while enabling relative axial movement between these parts. A retainer plate 20 having an inwardly projecting flange portion 21 extending behind the annular flange 14 of the hand wheel 11 is securely connected by means of screws or bolts 22 to the inner polygonal plate member 16. As a result thereof, upon rotation of the hand wheel 11 on the anti-friction bearing 15, the hand wheel 11 is displaced in the axial direction owing to the threaded engagement with the relatively fixed threaded main shaft portion 9 whereby the inner polygon section 16 is taken along in this axial movement by the plate 20 and the inter-engagement of the annular flanges 14 and 21.

The inner polygon plate member 16 is provided with external polygon surfaces 18, in the illustrated embodiment of four-lobed trochoidally-shaped configuration (FIG. 2). The polygon surfaces 18 taper downwardly toward the left side of the indexing device as viewed in FIGURE 1.

The outer polygon plate member generally designated by reference numeral 30 is provided with internal tapered polygon surfaces 31 of four-lobed tapered configuration, complementary to the external surfaces 18 of the inner polygon plate member 16. The outer polygon plate member 30 is additionally provided with external polygon surfaces 32, which taper in the same direction as the complementary polygon surfaces 18 and 31, but are of different shape, for example, in the illustrated embodiment, of three-lobed trochoidal shape. The external polygon surfaces 32 of the outer polygon plate member 30, in turn, are received within complementary polygon surfaces 41 of similar taper and provided near the inner end of the recess located in the right-hand end face of the housing 1. Small annular grooves 33 are provided along the outer, axially extending surfaces of the outer polygon plate member 30 which are of predetermined axial length so as to limit the axial movement of the outer polygon plate member 30 by means of the pins 42 mounted or secured at appropriate places within the housing recess. The retainer member 25 is secured to the left end face by means of bolts or screws 26 and is intended to take along the outer polygon plate member 30, after elimination of predetermined axial play, when the inner polygon plate member 16 is displaced in the axial direction by rotation of the hand wheel 11.

The left end of the main spindle 5, as viewed in FIGURE 1, is adapted to be connected by conventional means with a chuck of any known construction.

An index plate 50 may be provided to indicate the relative movement of the main shaft.

The operation of the hand-operated indexing chuck of FIGURES 1 and 2 is believed obvious. Upon rotation of the hand wheel 11 so as to move toward the right in the axial direction as viewed in FIGURE 1, the inner polygon plate member 16 is constrained to follow this axial movement, thereby disengaging the complementary surfaces 18 and 31. Upon disengagement of these surfaces and upon further rotation of the hand wheel 11, the outer polygon plate member 30 is eventually taken along in the axial direction by engagement of the member 25 with the adjacent inner left end face of the outer plate member 30. As a result of this axial movement of the outer polygon plate member 30, the surfaces 32 and 41 are disengaged from one another, the axial movement of the outer plate member 30 being limited by the pins 42 engaging in grooves 33. As a result, the surfaces 18, 31 and 32, 41 are now disengaged from one another. The new angular setting can now be established by approximately rotating the main shaft and the polygon master plate member 30 in appropriate directions and through appropriate angles. Assuming that the index plate 50 provides angular subdivision of 30°, the following possibilities then exist for obtaining 30, 60 and 90° indexing of the chuck, i.e., of the main spindle 5:

(1) For 30° turning of the main shaft 5, the polygon master plate member 30 is turned 120° in the same direction.

(2) For 60° turning of the mainshaft 5, the polygon master plate member 30 is turned 120° in the opposite direction.

(3) For 90° turning of the main shaft 5, the polygon master plate member 30 is not turned at all.

Other settings can be obtained by appropriately turning the hand wheel 10 and/or the polygon master plate member 30 through appropriate angles.

Having achieved the approximate correct positioning of the polygon master plate member 30 and of the main shaft 5, the hand wheel 11 is once more tightened by rotating the same in the opposite direction thereby causing progressive engagement of the three and four-sided polygon connecting surfaces 18, 31 and 32, 41 until the fit is tight once more. The approximate setting of the hand wheel 10 and of the polygon master plate member 30 thereby requires no great accuracy as the various parts are self-aligning owing to the polygonal connecting surfaces.

Figure 3:
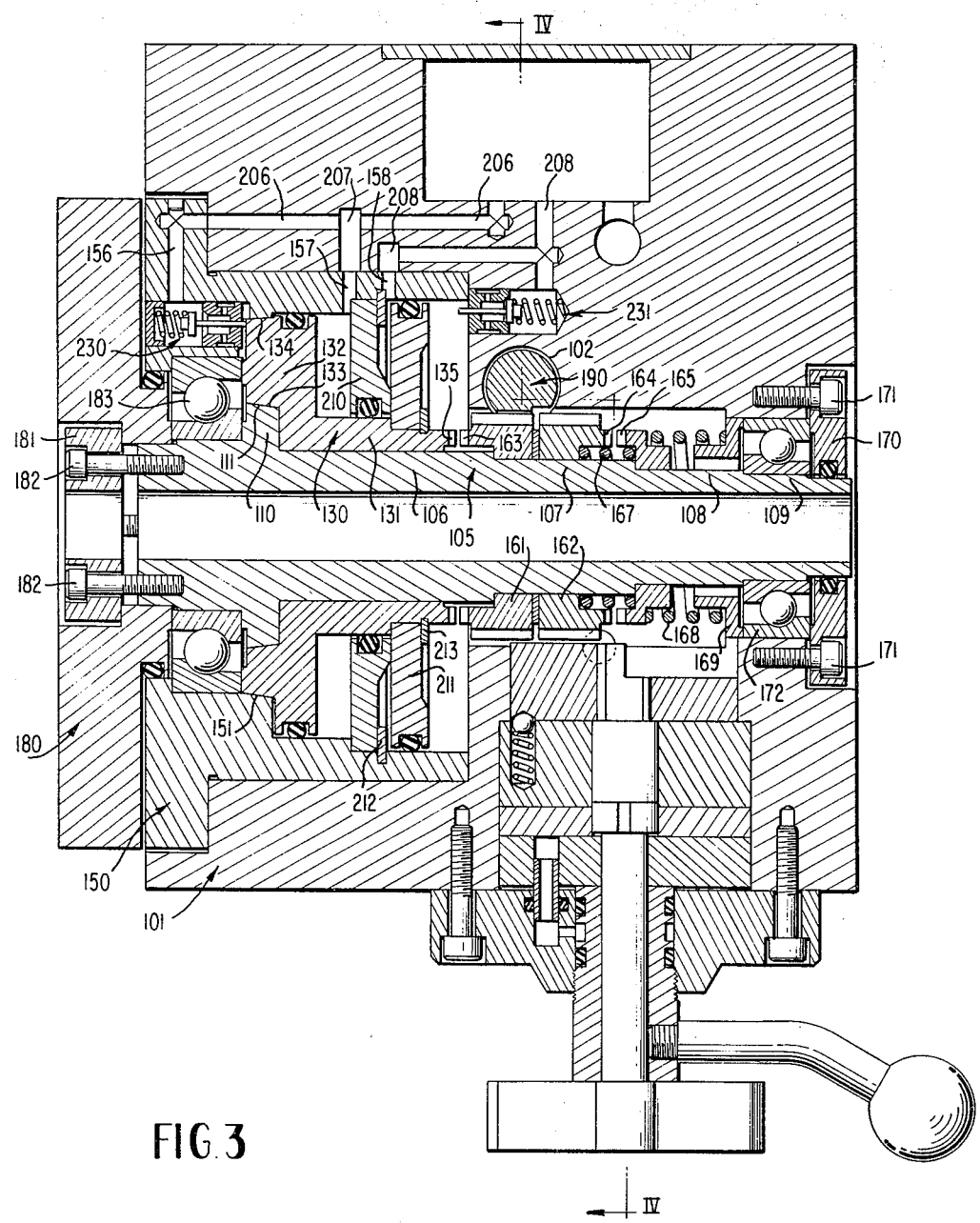
FIGURE 3 is an axial cross-sectional view through a modified embodiment of a pressure-medium-actuated polygon indexing device in accordance with the present invention.
Figure 4:
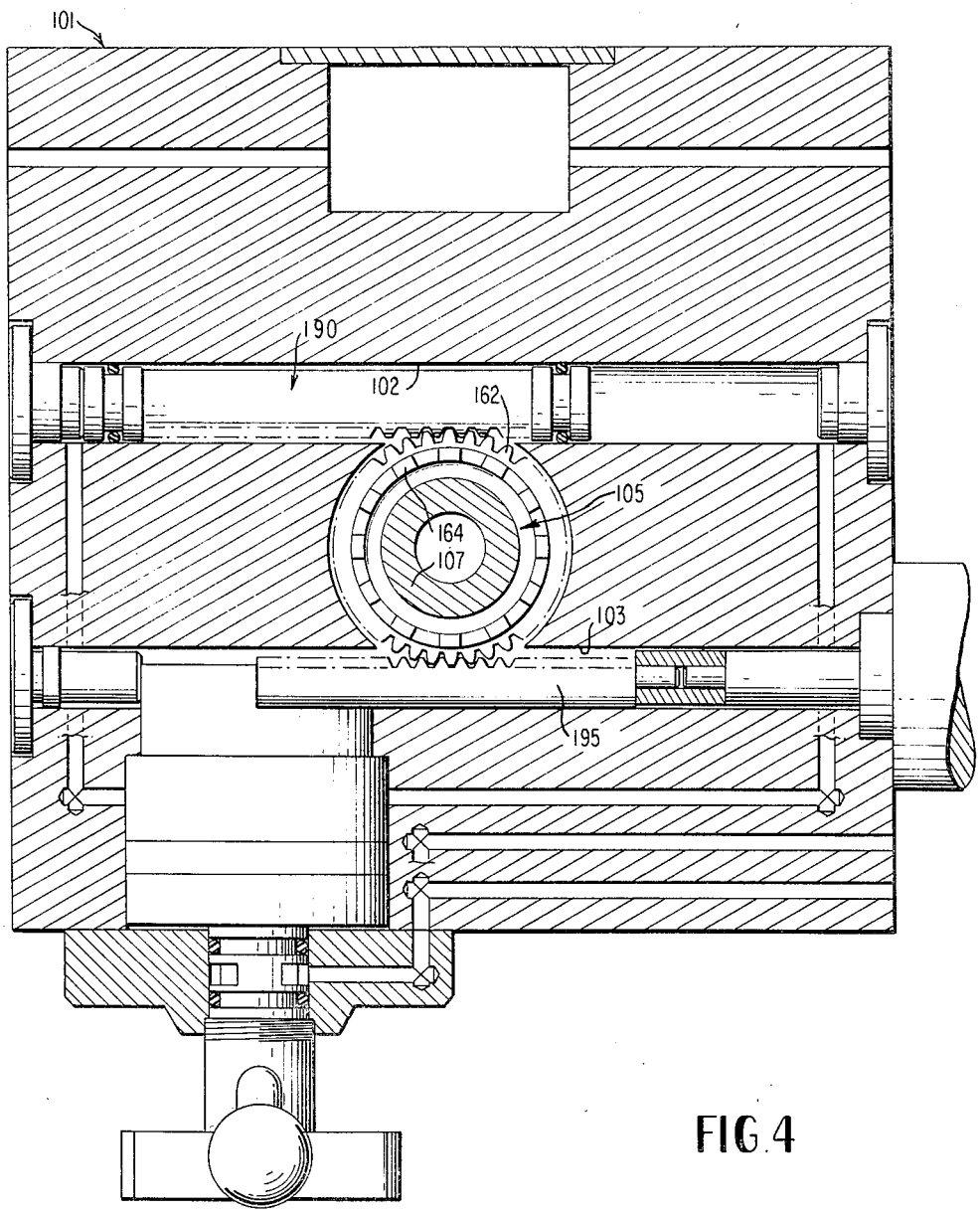
FIGURE 4 is a transverse cross-sectional view taken along line IV—IV of FIGURE 3.

FIGURES 3 and 4 illustrate an indexing device similar in principle to the manually operated indexing device of FIGURES 1 and 2 but adapted to be actuated by means of a pressure medium, i.e. pneumatically and/or hydraulically, to provide completely automatic sequencing. At the same time, the indexing mechanism of FIGURES 3 and 4 obviates the sliding polygon connection on the main shaft. Reference numeral 101 generally designates in FIGURES 3 and 4 the housing of the indexing device which is provided with appropriate bores and apertures to accommodate the various parts of the indexing mechanism to be more fully described hereinafter. The main spindle generally designated by reference numeral 105 is provided with several stepped portions 106, 107, 108 and 109 as well as with a radially extending portion 110 provided with external polygon surfaces 111 tapering downwards toward the right as viewed in FIGURE 3 and having, for example, a four-lobed trochoidal shape similar to that of FIGURE 2.

The polygon master plate member generally designated by reference numeral 130 includes a cylindrical sleeve portion 131 mounted over the stepped main shaft portion 106 and a radially extending, piston-like main portion 132 provided with internal polygon surfaces 133 tapering in the same direction as external polygon surfaces 111 and of complementary shape with repsect thereto. External polygon surfaces 134 are provided at the polygon master plate member 132 substantially radially opposite from the internal polygon surfaces 133. The flange member generally designated by reference numeral 150 is secured by an suitable means within the housing 101 and is provided with polygon internal surfaces 151 tapering in the same direction as surfaces 134 and of complementary shape. The surfaces 134, 151 may be, for example, of three-lobed, trochoidal shape, as in FIGURE 2.

Gear wheels 161 and 162 are rotatably mounted on the stepped portion 107 of the main shaft 105. Gear wheel 161 is thereby provided at its left end face with clutch claws 163 for eventual engagement with complementary clutch claws 135 provided at the right end face of the sleeve portion 131 of the polygon master plate member 130. The gear 162 is provided with similar clutch claws 164 for eventual engagement with complementary clutch claws 165 at the gear clutch member 166. The spring 167 normally seeks to disengage the clutch claws 164 while spring 168 seeks to engage the clutch claws 164, 165. Engagement and disengagement of the clutch claws 135, 163 takes place by means of the pressure medium displacing the polygon master plate 130 as will be described more fully hereinafter. Spring 168 abuts against the guide ring 169 suitably supported within the housing 101. End flange 170 is suitably secured to the housing 101 by screws or bolts 171, a thrust bearing 172 being disposed between the guide ring 169 and the flange 170 to rotatably support the stepped portion 109 of the main shaft 105 within the housing 101. The forward end of the indexing device includes a front flange generally designated by reference numeral 180 which is secured to the main shaft or spindle 105 by means of lock ring 181 and screws or bolts 182. Thrust bearing 183 rotatably supports the forward end of the main spindle 105 within flange 150.

A piston rack generally designated by reference numeral 190 is slidably accommodated within cross bore 102 of the housing 101. The piston rack 190 engages with the gear wheel 161 and upon displacement thereof in the axial direction rotates the gear wheel 161. A gear rack 195 slidably accommodated within housing bore 103 is operatively connected with the gear wheel 162 to impart to the latter the desired rotation.

The right end portion of the flange member 150 constitutes a hollow cylinder slidably receiving therein the piston-like polygon main plate member 132 as well as pistons 210 and 211 held against corresponding shoulders provided in the flange 150 and in the sleeve portion 131, respectively, by means of retainer rings 212 and 213. The flange member 150 is additionally provided with radial bores 156, 157, and 158 communicating respectively with bores in housing 101. Valve structures generally designated by reference numerals 230 and 231 provide appropriate control functions in the axial displacement of the master plate member 130 when lines 206 and 208 are selectively and alternately connected with the pressure medium source and with the discharge, respectively.

Any suitable known hydraulic and/or pneumatic control means may be used to selectively supply the pressure medium to the various parts to achieve the desired operation of the device including conventional valve structures which selectively connect the various lines with the source of pressure medium or with the discharge to cause the required to and fro motions as described more fully hereinafter.

In operation, assuming the parts to be in the positions shown in FIGURES 3 and 4, a pressure medium is supplied to line 206 in any conventional manner whereby the polygon master plate member 130 is caused to move toward the right, as viewed in FIGURE 3, thereby disengaging complementary polygon surfaces 111, 133 and complementary polygon surfaces 134 and 151 and engaging eventually claw clutches 135, 163 and 164, 165. Gears 161 and 162 are then rotated in a predetermined direction by a predetermined amount by application of the pressure medium to the respective sides of the piston rack 190 and pistons disposed on opposite sides of gear rack 195. As a result thereof, rotation of gear 161 will cause rotation of the polygon master plate member 130 while rotation of the gear 162 will cause rotation of the main spindle 105 by way of gear clutch 111 appropriately connected thereto. Spring 168 is thereby stronger than spring 167. Thereafter, line 206 is connected with the discharge while pressure medium is supplied to line 208 causing return movement of the master polygon plate member 130 which, in turn, causes disengagement of the master polygon plate member 130 and of the main shaft 105 from the gear wheels 161 and 162, respectively, due to disengagement of the claw clutches. In due course complementary polygon surfaces 111, 133 and 134, 151 will then be again tightly engaged, automatically aligning the parts to the accurate new indexing position.

Any suitable control means may also be used to cause movement of piston rack 190 and of gear rack 195 as well as to cause these parts to return to their predetermined starting position after completing their function during an indexing operation.

As mentioned above, any conventional control means may be used to achieve the desired control function, utilizing manually or automatically operated control devices of conventional construction in connection with the two embodiments of the indexing mechanism of FIGURES 1, 2 and 3, 4.

In addition to great accuracy of indexing, the present invention offers the following advantages:

(1) The ability to withstand far greater moments of force than the normal type of such devices which use dowel-pins in Roles or gears;

(2) Elimination of back-lash or "play" which is highly desirable when violent operations are being performed on the workpieces held in the index chuck or on the index table, besides elimination of errors in location accuracy;

(3) Small, light-weight, and very sturdy construction;

(4) Ease of operation;

(5) No minor errors together with fool-proof settings.

The inherent accuracy of the polygon system makes it a perfect means of indexing. The polygon profile errors cancel out over the length of the taper fits. The taper fits give excellent torque resistance which adds to the stability of the chuck. Furthermore, the longer a profile is made the more the errors are reduced to non-measurable quantities. The indexing device according to the present invention such as a chuck or index table makes use of this high index accuracy in conjunction with the high torque resistance of the non-round connection.

As noted in FIGURE 2, one further feature of the present invention involves the construction of the mating polygon profile surfaces in the form of figures having curvilinear sides.

While so-called P3 and P4 polygon profiles were described hereinabove in connection with both embodiments, providing 30° divisions, the present invention is not limited thereto but is susceptible of numerous changes and modifications of which some are given in the following table indicating the great versatility by the use of different configurations and/or numbers of polygons to obtain different subdivisions.

TABLE 1

Divisions of a circle available with various polygon profile arrangements

Using 2-sided polygon shape 180-degree divisions are available.

Using 3-sided polygon shape 120-degree divisions are available.

Using 4-sided polygon shape 90-degree divisions are available.

Using 5-sided polygon shape 72-degree divisions are available.

Using 6-sided polygon shape 60-degree divisions are available.
Using 8-sided polygon shape 45-degree divisions are available.
Using 9-sided polygon shape 40-degree divisions are available.
Using 10-sided polygon shape 36-degree divisions are available.
Using 2 and 3-sided polygon shape 60-degree divisions are available.
Using 2 and 5-sided polygon shape 36-degree divisions are available.
Using 2 and 9-sided polygon shape 20-degree divisions are available.
Using 3 and 4-sided polygon shape 30-degree divisions are available.
Using 3 and 5-sided polygon shape 24-degree divisions are available.
Using 3 and 8-sided polygon shape 15-degree divisions are available.
Using 3 and 10-sided polygon shape 12-degree divisions are available.
Using 4 and 5-sided polygon shape 18-degree divisions are available.
Using 4 and 9-sided polygon shape 10-degree divisions are available.
Using 5 and 8-sided polygon shape 9-degree divisions are available.
Using 5 and 9-sided polygon shape 8-degree divisions are available.
Using 2, 3, 5-sided polygon shape 12-degree divisions are available.
Using 3, 4, 5-sided polygon shape 6-degree divisions are available.
Using 3, 5, 8-sided polygon shape 3-degree divisions are available.
Using 5, 8 9-sided polygon shape 1-degree divisions are available.

Other multiple series of polygon profiles will result in further divisions of a circle.

While I have shown and described two embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. An indexing mechanism providing an accurate indexing at predetermined circle divisions of a relatively movable member, comprising a first stationary member provided with an annular polygonal surface of a first configuration, a second member having internal and external annular polygonal surfaces of dissimilar configuration, one of said last-mentioned internal and external polygonal surfaces being complementary to the polygonal surfaces of the stationary member, a third member provided with a polygonal surface complementary to the other one of the external and internal polygonal surfaces of said second member, the complementary polygonal surfaces of said members extending generally in the axial direction and being in normal engagement with each other, first means for disengaging the polygonal surfaces of the second member from the complementary surfaces of said first and third members by relative axial movement, and second means for rotating the last one of said second and third members relative to said first member to provide accurate indexing in a different circle position upon re-engagement of said complementary surfaces.

2. An indexing mechanism according to claim 1, wherein said second means is operable to impart relative rotary movement to said second and third members relative to said first member.

3. An indexing device according to claim 2, wherein said first member is a relatively stationary housing part provided with an internal polygonal surface, said third member being disposed within said second member and being provided with an external polygonal surface.

4. An indexing mechanism according to claim 3, wherein said first means includes a shaft provided with means to support thereon said third member so as to rotate in unison while permitting relative axial movement, and means for axially moving said third member to disengage the external polygonal surfaces thereof from the internal polygonal surfaces of said second member.

5. An indexing mechanism according to claim 4, further comprising means for axially moving said second member in unison with said third member including means providing a predetermined lost motion so that said second member is axially disengaged with the external polygonal surface from the internal polygonal surface of said first member only upon disengagement of the complementary polygonal surfaces of said third and second means.

6. An indexing mechanism according to claim 5, wherein said second means includes means for rotating said shaft and therewith said third member, and means for rotating said second member.

7. An indexing mechanism according to claim 6, wherein said complementary surfaces taper toward the axis in a direction opposite to the disengaging direction of said second and third member.

8. An indexing mechanism according to claim 1, wherein said second means includes means for rotating said second member and means for rotating said third member independently of rotation of said second member.

9. An indexing mechanism according to claim 1, wherein said first member is relatively fixed in the direction of rotation as well as in the axial direction, said third member being relatively fixed in the axial direction but being adapted to be rotated, and wherein said first means is operable to displace said second member axially with respect to said first and third member to disengage the complementary surfaces.

10. An indexing mechanism according to claim 9, wherein said second means is operable to impart relative rotation to said second and third members independently of one another.

11. An indexing mechanism according to claim 10, wherein said second means includes two rotatable gear wheels arranged coaxially to said second and third members, clutch means for selectively connecting one of the gear wheels with said third member and the other of said gear wheels with said second member upon axial disengaging movement of said second member, and rack means extending substantially transversely to the axis of said second and third members for rotating the respective gear wheel through a predetermined angle.

12. An indexing mechanism according to claim 11, wherein said first means includes hydraulic piston means for actuating said second member in the disengaging as well as re-engaging directions.

13. An indexing mechanism according to claim 12, wherein the complementary surfaces taper in mutually opposite directions.

14. An indexing mechanism according to claim 9, wherein said first means includes piston means actuated by a pressure medium for disengaging and re-engaging the complementary surfaces by axially displacing said second member relative to said first and third member.

15. An indexing mechanism according to claim 9, wherein the two sets of complementary surfaces taper in opposite directions.

16. An indexing mechanism according to claim 1, wherein said polygonal surfaces of said first member, said second member and said third member each define polygons with curvilinear sides.

17. An indexing mechanism according to claim 1, wherein said three members are arranged coaxially to one another.

References Cited

UNITED STATES PATENTS

| | | | |
|---|---|---|---|
| 2,353,115 | 7/1944 | Poreau | 74—826 X |
| 2,505,684 | 4/1950 | McClernon | 74—826 X |
| 3,246,543 | 4/1966 | Davidson | 74—826 |
| 3,339,538 | 9/1967 | Hohler | 125—11 |

HAROLD D. WHITEHEAD, Primary Examiner

U.S. Cl. X.R.

51—216; 279—5